US012686053B2

(12) United States Patent
Savage

(10) Patent No.: US 12,686,053 B2
(45) Date of Patent: Jul. 21, 2026

(54) TUNED DIFFERENTIAL SHRINKAGE SINTER JOINING

(71) Applicant: CUMMINS INC., Columbus, IN (US)

(72) Inventor: Howard S. Savage, Columbus, IN (US)

(73) Assignee: Cummins Inc., Columbus, IN (US)

( * ) Notice: Subject to any disclaimer, the term of this patent is extended or adjusted under 35 U.S.C. 154(b) by 287 days.

(21) Appl. No.: 18/277,042

(22) PCT Filed: Feb. 18, 2022

(86) PCT No.: PCT/US2022/016931
§ 371 (c)(1),
(2) Date: Aug. 11, 2023

(87) PCT Pub. No.: WO2022/182586
PCT Pub. Date: Sep. 1, 2022

(65) Prior Publication Data
US 2024/0116108 A1 Apr. 11, 2024

Related U.S. Application Data

(60) Provisional application No. 63/152,974, filed on Feb. 24, 2021.

(51) Int. Cl.
*B33Y 80/00* (2015.01)
*B22F 3/22* (2006.01)
(Continued)

(52) U.S. Cl.
CPC ................ *B22F 7/06* (2013.01); *B22F 3/225* (2013.01); *B22F 10/14* (2021.01); *B22F 10/64* (2021.01);
(Continued)

(58) Field of Classification Search
CPC .. B22F 7/06; B22F 3/225; B22F 10/14; B22F 10/64; B22F 2998/10; B22F 3/1021;
(Continued)

(56) References Cited

U.S. PATENT DOCUMENTS

| | | | |
|---|---|---|---|
| 3,564,328 A | 2/1971 | Bagley | |
| 4,969,262 A * | 11/1990 | Hiraoka | ................ F16H 53/025 |
| | | | 74/567 |

(Continued)

FOREIGN PATENT DOCUMENTS

| | | | |
|---|---|---|---|
| CN | 111287594 A | 6/2020 | |
| FR | 895819 A * | 2/1945 | ................ B22F 7/06 |
| WO | WO-2020/232555 | 11/2020 | |

OTHER PUBLICATIONS

[NPL-1] Hans et al. (FR 895819 A); Feb. 5, 1945 (European Patent Office machine translation to English). (Year: 1945).*
(Continued)

*Primary Examiner* — Donald M Flores, Jr.
(74) *Attorney, Agent, or Firm* — Foley & Lardner LLP

(57) ABSTRACT

A system for an engine comprises a component manufactured via additive manufacturing. The component includes a first material with a first contraction rate. An insert is disposed in the component and comprises a second material with a second contraction rate that is lower than the first contraction rate. When the component and the insert are exposed to a temperature suitable for sintering, the component contracts around the insert, thereby coupling the insert and the component.

12 Claims, 2 Drawing Sheets

(51) Int. Cl.

| | |
|---|---|
| *B22F 7/06* | (2006.01) |
| *B22F 10/14* | (2021.01) |
| *B22F 10/64* | (2021.01) |
| *B33Y 10/00* | (2015.01) |
| *B33Y 40/20* | (2020.01) |

(52) U.S. Cl.
CPC ............... *B33Y 10/00* (2014.12); *B33Y 40/20*
(2020.01); *B33Y 80/00* (2014.12); *B22F*
*2998/10* (2013.01); *Y10T 428/24992* (2015.01)

(58) Field of Classification Search
CPC ......... B33Y 10/00; B33Y 40/20; B33Y 80/00;
Y10T 428/24992
See application file for complete search history.

(56) References Cited

U.S. PATENT DOCUMENTS

| | | | |
|---|---|---|---|
| 5,204,055 A | 4/1993 | Sachs et al. | |
| 6,293,185 B1 | 9/2001 | Stoppek et al. | |
| 6,473,964 B1 * | 11/2002 | Anderson | F01L 1/047 |
| | | | 29/447 |
| 6,994,014 B2 | 2/2006 | Rober et al. | |
| 7,550,107 B2 | 6/2009 | Morrison et al. | |
| 9,056,354 B2 | 6/2015 | Merrill et al. | |
| 9,815,118 B1 | 11/2017 | Schmitt et al. | |
| 10,456,833 B2 | 10/2019 | Gibson et al. | |
| 2010/0028645 A1 | 2/2010 | Maguire et al. | |
| 2010/0033114 A1 | 2/2010 | Ramaiah | |
| 2017/0321488 A1 | 11/2017 | Smith et al. | |
| 2018/0264554 A1 | 9/2018 | Taylor | |
| 2018/0370213 A1 | 12/2018 | Gold et al. | |

OTHER PUBLICATIONS

Office Action for CN Application No. 202280016021.5, dated Jul. 2, 2025.

International Search Report and Written Opinion for PCT Application No. PCT/US2022/016931, dated May 18, 2022.

\* cited by examiner

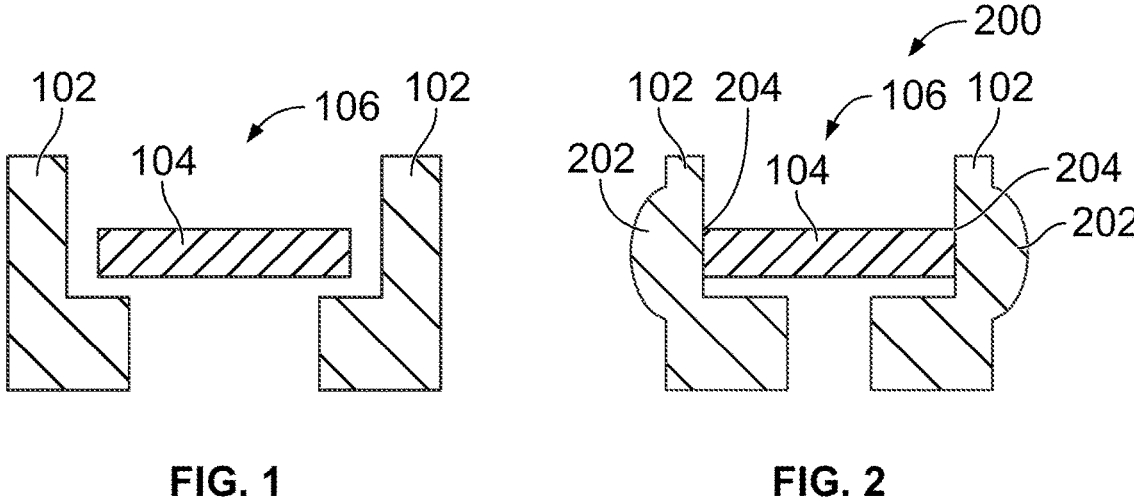
FIG. 1                    FIG. 2
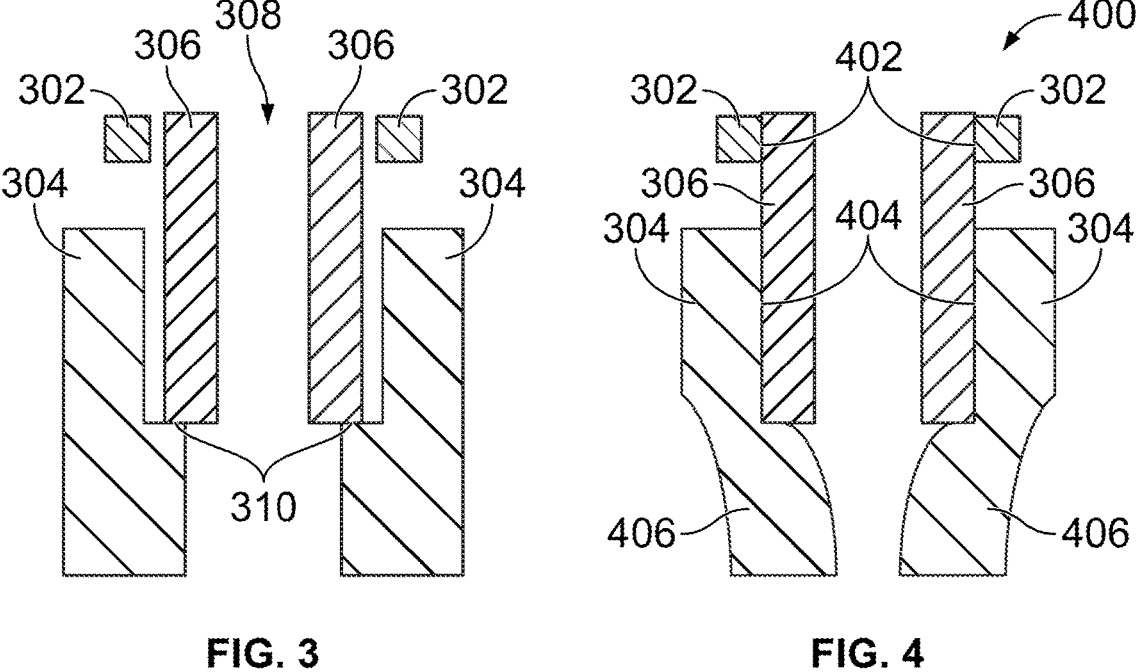
FIG. 3                    FIG. 4

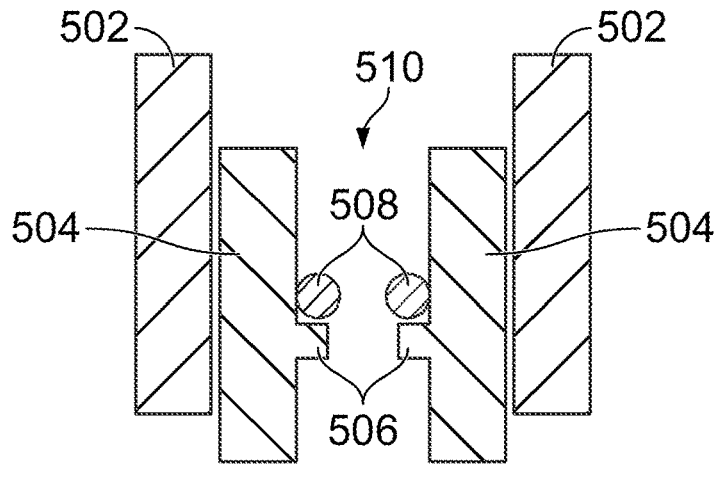
FIG. 5
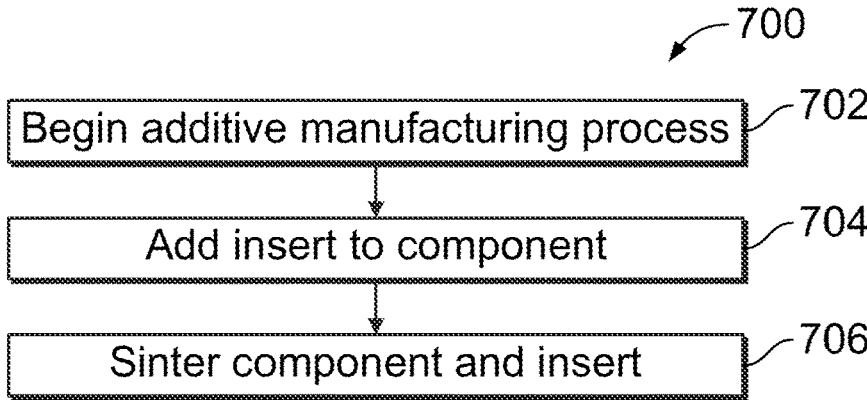
FIG. 6
---
| Begin additive manufacturing process | 702 |
| --- | --- |
↓
| Add insert to component | 704 |
| --- | --- |
↓
| Sinter component and insert | 706 |
| --- | --- |
FIG. 7

TUNED DIFFERENTIAL SHRINKAGE SINTER JOINING

CROSS-REFERENCE TO RELATED PATENT APPLICATIONS

This present disclosure is a U.S. national phase of PCT Application No. PCT/US2022/016931, filed Feb. 18, 2022, which claims priority to U.S. Provisional Application No. 63/152,974, entitled "Tuned Differential Shrinkage Sinter Joining," filed Feb. 24, 2021, the contents of which are incorporated herein by reference in their entirety.

TECHNICAL FIELD

The present disclosure relates components produced by additive manufacturing.

BACKGROUND

A component, such as a component for an engine, may be manufactured using various processes. One subset of these processes is additive manufacturing where portions of material are formed sequentially on top of other portions of material. By selecting where and when the portions are formed, three-dimensional shapes can be constructed. However, producing components using additive manufacturing presents several challenges. For example, it may be difficult to use additive manufacturing to produce components with closures, seals, and/or bonds between members of the component.

SUMMARY

One embodiment relates to a system for an engine comprising an engine component manufactured via additive manufacturing. The engine component includes a first material with a first contraction rate. An insert is disposed in the engine component and comprises a second material with a second contraction rate that is lower than the first contraction rate. When the engine component and the insert are exposed to a temperature suitable for sintering, the engine component contracts around the insert, thereby coupling the insert and the engine component.

Another embodiment relates to a method for forming an assembly for an engine. The method includes generating an engine component with an additive manufacturing process and disposing an insert in the engine component. The method further includes heating the engine component and the insert to a temperature suitable for sintering, thereby causing the engine component to contract around the insert.

Another embodiment relates to a component in an engine. A body comprises a first material with a first contraction rate. An insert is disposed in the component and comprises a second material with a second contraction rate that is lower than the first contraction rate such that when the component and the insert are exposed to a temperature suitable for sintering, the first material contracts around the insert.

Another embodiment relates to an engine system including a component comprising a first material with a first contraction rate. An insert is disposed in the component and includes a second material with a second contraction rate that is lower than the first contraction rate. When the component and the insert are exposed to a temperature suitable for sintering, the component contracts around the insert.

BRIEF DESCRIPTION OF THE FIGURES

FIG. 1 is an illustration of a component and a closure insert before a sintering process, according to a particular embodiment.

FIG. 2 is an illustration of an assembly comprising the component and the closure insert, both of FIG. 1, after a sintering process, according to a particular embodiment.

FIG. 3 is an illustration of a first component, a second component, and a bonding insert before a sintering process, according to a particular embodiment.

FIG. 4 is an illustration of an assembly comprising the first component, the second component, and the bonding insert, all of FIG. 3, after a sintering process, according to a particular embodiment.

FIG. 5 is an illustration of a first component, a second component, and a seal insert, according to a particular embodiment.

FIG. 6 is an illustration of an assembly comprising the component and the seal insert, both of FIG. 5, after a sintering process, according to a particular embodiment.

FIG. 7 is a flow diagram of a method to use an insert during an additive manufacturing process.

DETAILED DESCRIPTION

Following below are more detailed descriptions of methods, apparatuses, and systems for producing components using an additive manufacturing process. The methods, apparatuses, and systems introduced above and discussed in greater detail below may be implemented in any of numerous ways, as the described concepts are not limited to any particular manner of implementation. Examples of specific implementations and applications are provided primarily for illustrative purposes.

Binder jetting is a type of additive manufacturing process where a layer of powdered material is deposited on a surface, and portions of the layer of powdered material are bound together with a liquid before another layer of powdered material is added. The binding process continues layer by layer until the final component is complete. The final component is not fully consolidated (e.g., the powder particles that are bound together are individual particles and are only coupled by the liquid binder). After the final component is formed, the component is sintered (e.g., heated to a temperature below the melting point of the component) to fuse (e.g., consolidate) the powder particles together and form a solid component. The sintering process causes the component to contract (e.g., shrink).

Binder jetting may be used to create a component that would normally require multiple parts to create using traditional manufacturing processes. Binder jetting may also be used to create a component that requires a closure or a seal between parts or a component that requires parts to be bonded. However, it may be difficult to create the desired seal, closure, or bond when the entire component is created from the same material. For example, during the sintering process after the component is created, the material of the component contracts at the same rate, making it difficult to create a seal, closure, or bond in various sections of the component.

Embodiments described herein provide a system and method to create a seal, closure, or bond in sections of a component manufactured using binder jetting. In various embodiments, an insert is provided either during the binder jetting process or after the binder jetting process is complete, where the insert is added to the component in the location where a seal, closure, or bond is desired. The material of the insert may be a more consolidated material than the component manufactured using binder jetting (e.g., the density of the insert may be greater than the density of the component) such that the insert shrinks at a different rate than the rest of the component. Therefore, in embodiments described herein, the component shrinks around the insert at a rate different than the insert, and the difference in shrinkage rates create the desired seal, closure, or bond.

In various embodiments described herein, the insert may be a variety of shapes including, but not limited to, a tube, pin, disc, sphere, etc. The insert may also be formed of a variety of materials that are denser (e.g., more consolidated) than the powder material used in the binder jetting process.

It should be understood that, while the description and Figures herein are primarily directed to systems and methods to create a component with an additive manufacturing process, this description is not meant to be limiting. The systems and methods described herein are also applicable to accomplish other effects.

Referring now to FIG. 1, an illustration of a component 102 (such as an engine component) and a closure insert 104 before a sintering process is shown, according to a particular embodiment. The component 102 may be any type of component manufactured via an additive manufacturing process (e.g., binder jetting). Accordingly, the component 102 may be manufactured from any material used in an additive manufacturing process. Such materials include, but are not limited to, stainless steel, austenitic nickel-chromium based superalloys (commonly referred to under the Inconel trademark), tungsten carbide, and other metals and/or ceramics. As shown, the component 102 is shown in cross-section such that the component 102 defines an opening 106 that extends through a central portion of the component 102.

In some instances, the component 102 may need to be closed (e.g., to prevent a fluid and/or gas from flowing through the opening 106, to couple with another component, etc.). In some embodiments, a closure can be added to the component 102 as part of the additive manufacturing process (e.g., the closure may be produced by the additive manufacturing process at the same time as the component 102). In such embodiments, the closure and the component 102 are the same material and therefore will contract at the same rate during a subsequent sintering process. Accordingly, the connection between the closure and the component 102 is no stronger at an interface between the closure and the component than the connection between various powder particles throughout the component 102.

In some instances, an additional part (e.g., the closure insert 104) is used to create the desired closure. As shown, the closure insert 104 is sized to fit within the opening 106. The closure insert 104 may be sized such that there is a gap between the closure insert 104 and the component 102. The closure insert 104 may also be sized such that there is not a gap between the closure insert 104 and the component 102 (e.g., the closure insert 104 is press fit within the component 102). In some embodiments, an inner wall of the component 102 is angled such that the opening 106 is a first size at a first position within the component 102 (e.g., at a first end of the component) and the opening 106 is a second size at a second position within the component 102. In such embodiments, the closure insert 104 is sized such that there is a gap between the closure insert 104 and the component 102 at the first position and that there is no gap between the closure insert 104 and the component 102 at the second position. Accordingly, the closure insert 104 can be placed into the opening 106 and the closure insert 104 will move within the component 102 until the closure insert 104 contacts the component 102 at the second position.

The closure insert 104 may be constructed from a different material than that of the component 102, and therefore the closure insert 104 contracts at a rate that is different than that of the component 102. The closure insert 104 may also be constructed from the same material as that of the component 102, but the material of the closure insert 104 may be more consolidated than that of the component 102. As used herein, the term "more consolidated" refers to a material in which the spaces between individual particles are smaller than in a less consolidated material such that a density of the more consolidated material is greater than a density of the less consolidated material. For example, both the component 102 and the closure insert 104 may comprise stainless steel, however the closure insert 104 may be heat treated stainless steel whereas the component 102 is not treated, such that the heat treated stainless steel is more consolidated than a non-heat treated stainless steel. In such embodiments, the closure insert 104 will contract at a rate that is different from than that of the component 102. In either of the examples provided above, to create a closure stronger than one that can be created using additive manufacturing alone, the contraction rate of the closure insert 104 is lower than that of the component 102 (e.g., the closure insert 104 contracts less than the component 102).

FIG. 2 is an illustration of an assembly 200 comprising the component 102 and the closure insert 104, both of FIG. 1, after a sintering process, according to a particular embodiment. In some embodiments, the assembly 200 is part of an engine (e.g., internal combustion, hybrid, electric, etc.) or other energy conversion device (e.g., power generator, etc.). As described with respect to FIG. 1, the closure insert 104 is added to the component 102 prior to the sintering process. In some embodiments, the closure insert 104 is added to the component 102 after the component 102 is manufactured using an additive manufacturing process. The closure insert 104 may also be added to the component 102 while the component 102 is being manufactured using an additive manufacturing process. In either instance, after the assembly 200 is manufactured, it goes through the sintering process, where both the component 102 and the closure insert 104 contract. Because the closure insert 104 does not contract as much as the component 102 (or contracts at a slower rate than the component 102), the component 102 contacts the closure insert 104 at an interface 204 between the component 102 and the closure insert 104. Furthermore, because the component 102 contracts more than the closure insert 104, the component 102 undergoes higher contact stress than the insert closure 104 at the interface 204, which promotes bonding between the component 102 and the closure insert 104. The difference in contraction rates as described is also referred to as "differential shrinkage."

The difference in contraction rates between the component 102 and the closure insert 104 may cause local deformation of the component 102 during the sintering process such that a bulge 202 is formed. The closure insert 104 is sized and constructed to cause the bulge 202 while preventing cracking/tearing of the component 102 during sintering.

FIG. 3 is an illustration of a first component 302, a second component 304 and a bonding insert 306 before a sintering process, according to a particular embodiment. The first component 302 and the second component 304 may be any type of component manufactured via an additive manufacturing process (e.g., binder jetting). Accordingly, the first component 302 and the second component 304 may be manufactured from any material used in an additive manufacturing process. Such materials include, but are not limited to, stainless steel, austenitic nickel-chromium based super-alloys (commonly referred to under the Inconel trademark), tungsten carbide, and other metals and/or ceramics. As shown, the first component 302 and the second component 304 are shown in cross-section such that the first component 302 and the second component 304 define an opening 308 that extends through a central portion of the first component 302 and the second component 304. In some embodiments, the first component 302 and the second component 304 are manufactured during separate additive manufacturing processes. The first component 302 and the second component 304 may also be manufactured during a single additive manufacturing process.

In some instances, the first component 302 and the second component 304 may need to be coupled (e.g., to strengthen a connection between the first component 302 and the second component 304, to facilitate connections to additional components, etc.). In some embodiments, an additional component can be added to the first component 302 and the second component 304 as part of the additive manufacturing process (e.g., the additional component may be produced by the additive manufacturing process at the same time as the first component 302 and the second component 304). In such embodiments, the additional component, the first component 302, and the second component 304 are the same material and therefore will contract at the same rate during a subsequent sintering process. Accordingly, the connection between the first component 302, the second component 304, and an additional component is no stronger at an interface between the various components than the connection between various powder particles throughout the first component 302 and the second component 304.

An additional part (e.g., the bonding insert 306) may be used to create the desired bond between the various components. As shown, the bonding insert 306 is sized to fit within the opening 308. In some embodiments, the bonding insert 306 is sized such that there is a gap between the bonding insert 306 and the first component 302, and between the bonding insert 306 and the second component 304. The bonding insert 306 may also be sized such that there is not a gap between the bonding insert 306 and the first component 302 and/or between the bonding insert 306 and the second component 304 (e.g., the bonding insert 306 is press fit within the first component 302 and the second component 304). In some arrangements, an inner wall of the first component 302 and an inner wall of the second component 304 are angled such that the opening 308 is a first size at a first position within the first component 302 and the opening 308 is a second size at a second position within the second component 304. In such arrangements, the bonding insert 306 is sized such that there is a gap between the bonding insert 306 and the first component 302 at the first position and that there is no gap between the bonding insert 306 and the second component 304 at the second position. Accordingly, the bonding insert 306 can be placed into the opening 308 and the bonding insert 104 will move within the second component 304 until the bonding insert 306 contacts the second component 304 at the second position.

In the embodiment shown in FIG. 3, the second component 304 includes a ledge 310 that is configured to receive the bonding insert 306. For example, the ledge 310 comprises a dimension (e.g., a diameter, length, etc.) that is smaller than a corresponding dimension of the bonding insert 306. Accordingly, when the bonding insert 306 is inserted into the opening 308, the bonding insert can travel within the second component 304 until the bonding insert 306 contacts the ledge 310.

In some embodiments, the bonding insert 306 is constructed from a different material than that of the first component 302 and the second component 304, and therefore the bonding insert 306 contracts at a rate that is different than that of the first component 302 and the second component 304. The bonding insert 306 may also be constructed from the same material as that of the first component 302 and the second component 304, but the material of the bonding insert 306 is more consolidated than that of the first component 302 and the second component 304. For example, the first component 302, the second component 304, and the bonding insert 306 may all comprise stainless steel, however the bonding insert 306 may be heat treated stainless steel whereas the first component 302 and the second component 304 are not treated. In such instances, the bonding insert 306 will contract at a rate that is different from than that of the first component 302 and the second component 304. In either of the examples provided above, to create a bond stronger than one that can be created using additive manufacturing alone, the contraction rate of the bonding insert 306 is lower than that of the first component 302 and the second component 304 (e.g., the bonding insert 306 contracts less than the component 102).

FIG. 4 is an illustration of an assembly 400 comprising the first component 302, the second component 304 and the bonding insert 306, all of FIG. 3, after a sintering process, according to a particular embodiment. In some embodiments, the assembly 200 is part of an engine (e.g., internal combustion, hybrid, electric, etc.) or other energy conversion device (e.g., power generator, etc.). As described with respect to FIG. 3, the bonding insert 306 is added to the first component 302 and the second component 304 prior to the sintering process. In some embodiments, the bonding insert 306 is added to the first component 302 and the second component 304 after the first component 302 and the second component 304 are manufactured using an additive manufacturing process. The bonding insert 306 may also be added to the first component 302 and the second component 304 while the first component 302 and the second component 304 are being manufactured using an additive manufacturing process. In either embodiment, after the assembly 400 is manufactured, it goes through the sintering process, where the first component 302, the second component 304, and the bonding insert 306 contract. Because the bonding insert 306 does not contract as much as the first component 302 and the second component 304 (or contracts at a slower rate), the first component 302 and the second component 304 contact the bonding insert 306 at a first interface 402 between the first component 302 and the bonding insert 306 and at a second interface 404 between the second component 304 and the bonding insert 306. Furthermore, because the first component 302 and the second component 304 contract more than the bonding insert 306 (e.g., differential shrinkage), the first component 302 and the second component 304 undergo higher contact stress than the bonding insert 306 at the first interface 402 and the second interface 404, which promotes bonding between the first component 302, the second component 304, and the bonding insert 306.

The difference in contraction rates between the first component 302, the second component 304, and the bonding insert 306 may cause local deformation of the first component 302 and the second component 304 during the sintering process. Such deformation may cause one or both of the first component 302 and the second component 304 to locally deform around the bonding insert 306. As shown in FIG. 4, the second component 304 is locally deformed around a lower portion of the bonding insert 306 to create a tapered portion 406 of the second component 304. The bonding insert 306 is sized and constructed to cause such local deformation while preventing cracking/tearing of the first component 302 and the second component 304 during sintering.

FIG. 5 is an illustration of a first component 502, a second component 504, and a seal insert 508, according to a particular embodiment. The first component 502 and the second component 504 may be any type of component manufactured via an additive manufacturing process (e.g., binder jetting). Accordingly, the first component 502 and the second component 504 may be manufactured from any material used in an additive manufacturing process. Such materials include, but are not limited to, stainless steel, austenitic nickel-chromium based superalloys (commonly referred to under the Inconel trademark), tungsten carbide, and other metals and/or ceramics. As shown, the first component 502 and the second component 504 are shown in cross-section such that the first component 502 and the second component 504 define an opening 510 that extends through a central portion of the first component 502 and the second component 504. In some embodiments, the first component 502 and the second component 504 are manufactured during separate additive manufacturing processes. In some embodiments, the first component 502 and the second component 504 are manufactured during a single additive manufacturing process.

In some instances, a seal may need to be included with the first component 502 and the second component 504 (e.g., to create a seal with another component inserted through the opening 510, etc.). In some embodiments, an additional component can be added to the first component 502 and the second component 504 as part of the additive manufacturing process to add the seal (e.g., the additional component may be produced by the additive manufacturing process at the same time as the first component 502 and the second component 504). In such embodiments, the additional component, the first component 502, and the second component 504 are the same material and therefore will contract at the same rate during a subsequent sintering process. Accordingly, the connection between the first component 502, the second component 504, and an additional component is no stronger at an interface between the various components than the connection between various powder particles throughout the first component 502 and the second component 504.

An additional part (e.g., the seal insert 508) may also be used to create the desired sealing surface. In the embodiment shown in FIG. 5, the seal insert 508 is sized to fit on a ledge 506 of the second component 504. The position of the seal insert 508 is an example position, and one of ordinary skill will understand that the seal insert 508 may be sized to fit in various other locations in which a seal may be desired. The seal insert 508 may be sized such that there is a gap between the seal insert 508 and the second component 504. The seal insert 508 may also be sized such that there is not a gap between the seal insert 508 and the second component 504 (e.g., the seal insert 508 is press fit within the second component 504). In some embodiments, an inner wall of the second component 504 is angled such that the opening 510 is a first size at a first position within the second component 504 (e.g., at a first end of the second component 504) and the opening 510 is a second size at a second position within the second component 504. In such embodiments, the seal insert

508 is sized such that there is a gap between the seal insert 508 and the second component 504 at the first position and that there is no gap between the seal insert 508 and the second component 504 at the second position. Accordingly, the seal insert 508 can be placed into the opening 510 and the seal insert 508 will move within the second component 504 until the seal insert 508 contacts the second component 504 at the second position.

The seal insert 508 may be constructed from a different material than that of the first component 502 and the second component 504, and therefore the seal insert 508 contracts at a rate that is different than that of the first component 502 and the second component 504. In some embodiments, the seal insert 508 is constructed from the same material as that of the first component 502 and the second component 504, but the material of the seal insert 508 is more consolidated than that of the first component 502 and the second component 504. For example, the first component 502, the second component 504, and the seal insert 508 may all comprise stainless steel, however the seal insert 508 may be heat treated stainless steel whereas the first component 502 and the second component 504 are not treated. In such embodiments, the seal insert 508 will contract at a rate that is different from than that of the first component 502 and the second component 504. In either of the examples provided above, to create a closure stronger than one that can be created using additive manufacturing alone, the contraction rate of the seal insert 508 is lower than that of the first component 502 and the second component 504 (e.g., the seal insert 508 contracts less than the first component 502 and the second component 504).

FIG. 6 is an illustration of an assembly 600 comprising the first component 502, the second component 504, and the seal insert 508, all of FIG. 5, after a sintering process, according to a particular embodiment. In some embodiments, the assembly 200 is part of an engine (e.g., internal combustion, hybrid, electric, etc.) or other energy conversion device (e.g., power generator, etc.). As described with respect to FIG. 5, the seal insert 508 is added to the first component 502 and the second component 504 prior to the sintering process. In some embodiments, the seal insert 508 is added to the first component 502 and the second component 504 after the first component 502 and the second component 504 are manufactured using an additive manufacturing process. The seal insert 508 may also be added to the first component 502 and the second component 504 while the first component 502 and the second component 504 are being manufactured using an additive manufacturing process. In either embodiment, after the assembly 600 is manufactured, it goes through the sintering process, where the first component 502, the second component 504, and the seal insert 508 contract. Because the seal insert 508 does not contract as much as the first component 502 and the second component 504 (or contracts at a slower rate, e.g., differential shrinkage), the second component 504 contacts the seal insert 508 at the ledge 506 and one or more additional interfaces (e.g., a first interface 602 and a second interface 604). Furthermore, because the first component 502 and the second component 504 contract more than the seal insert 508, the first component 502 and the second component 504 undergo higher contact stress than the seal insert 508 at the first interface 602 and the second interface 604, which promotes bonding between the first component 502, the second component 504, and the seal insert 508.

The difference in contraction rates between the first component 502, the second component 504, and the seal insert 508 may cause local deformation of the first component 502 and the second component 504 during the sintering process. Such deformation may cause one or both of the first component 502 and the second component 504 to locally deform around the seal insert 508. As shown in FIG. 6, the second component 504 is locally deformed around the seal insert 508 to create a tapered portion 606 of the second component 504. The seal insert 508 is sized and constructed to cause such local deformation while preventing cracking/tearing of the first component 502 and the second component 504 during sintering.

After the sintering process, the seal insert 508 is held in place by the second component 504 such that the seal insert 508 can create a seal with an additional part that is inserted through the opening 510.

FIG. 7 is a flow diagram of an example method 700 to use an insert during an additive manufacturing process.

At 702, an additive manufacturing process is started. For example, the additive manufacturing process can be a binder jetting process used to manufacture one or more components.

At 704, an insert is added to a component. For example, a closure insert (e.g., the closure insert 104) is added to a component being manufactured using additive manufacturing. As another example, a bonding insert (e.g., the bonding insert 306) is added to a component being manufactured using additive manufacturing. As yet another example, a seal insert (e.g., the seal insert 508) is added to a component being manufactured using additive manufacturing. In some embodiments, the insert is added to the component after the additive manufacturing process is complete. In some embodiments, the insert is added to the component during the additive manufacturing process.

At 706, the component and the insert are sintered. For example, the component and the insert are placed in an oven that heats the component and the insert to a temperature below the melting temperature of the component and the insert. The sintering temperature is sufficient to cause the particles deposited during the additive manufacturing process to bond together.

Though the inserts described above (e.g., the closure insert 104, the bonding insert 306, and the seal insert 508) are shown as having a certain shape, one of ordinary skill in the art would understand that an insert can include a variety of shapes (e.g., a tube, pin, disc, sphere, square, etc.) in a variety of sizes.

Furthermore, though specific functions of the inserts were described above, various inserts can be used for a variety of purposes (e.g., tooling inserts, valve seats, etc.).

In addition, though the systems and methods are described above relative to a binder jetting process, the systems and methods described above can be applied to a variety of additive manufacturing processes and other powder metallurgy processes, including metal injection molding and conventional powder metallurgy.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A system for an engine, comprising:
an engine component manufactured via additive manufacturing, the engine component comprising a first material of a first density with a first contraction rate and a ledge; and
an insert disposed in the engine component and in contact with the ledge, the insert comprising a second material of a second density with a second contraction rate that is lower than the first contraction rate, the second density greater than the first density;
wherein when the engine component and the insert are exposed to a temperature suitable for sintering, the engine component contracts around the insert, thereby coupling the insert and the engine component.

2. The system of claim 1, wherein the first material and the second material are comprised of the same constituents.

3. The system of claim 1, wherein the engine component is a first engine component, and wherein the system is further comprising a second engine component, and the insert coupling the first engine component to the second engine component.

4. The system of claim 3, wherein the second engine component has a third contraction rate, the second contraction rate of the insert is lower than the third contraction rate of the second engine component.

5. A component in an engine, comprising:

a body including a ledge and comprising a first material of a first density with a first contraction rate; and an insert disposed in the body and in contact with the ledge, the insert comprising a second material of a second density with a second contraction rate that is lower than the first contraction rate, the second density greater than the first density, such that when the body and the insert are exposed to a temperature suitable for sintering, the body contracts around the insert to form a bulge having a greater width than a width of the body above and below the insert.

6. The component of claim 5, wherein the insert is a bonding insert.

7. The component of claim 5, wherein the insert is a sealing insert.

8. The component of claim 5, wherein the insert is a closure insert.

9. An engine system, comprising:

a component comprising a first material of a first density with a first contraction rate, the component defining an opening that extends through a central portion of the component; and an insert disposed in the component, the insert comprising a second material of a second density with a second contraction rate that is lower than the first contraction rate, the second density greater than the first density, wherein the component comprises a ledge that extends into the opening, the ledge in contact with the insert.

10. The engine system of claim 9, wherein the insert is disposed within the opening.

11. The engine system of claim 9, wherein the insert is sized such that there is a gap between the insert and the component.

12. The engine system of claim 9, wherein the insert is sized such that the insert is press fit within the component.

\* \* \* \* \*